E. H. HALL.
Roller-Journal Boxes.

No. 157,599.  Patented Dec. 8, 1874.

UNITED STATES PATENT OFFICE.

EDWARD H. HALL, OF BROOKLYN, NEW YORK.

IMPROVEMENT IN ROLLER-JOURNAL BOXES.

Specification forming part of Letters Patent No. 157,599, dated December 8, 1874; application filed November 19, 1874.

*To all whom it may concern:*

Be it known that I, EDWARD H. HALL, of Brooklyn, in the county of Kings and State of New York, have invented a new and useful Improvement in Roller-Journal Boxes; and I do hereby declare that the following is a full, clear, and exact description thereof, reference being had to the accompanying drawing forming part of this specification.

My invention relates to certain improvements for reducing the friction in journal-boxes for shafts and axles; and the invention consists in the combination, with one or more circular series of anti-friction rollers arranged outside of the journal, of a corresponding number of rings surrounding the several series of rollers, and interposed between them and the journal, and a corresponding number of fixed circular bearings arranged one within each series of rollers and its surrounding ring.

Figure 1:
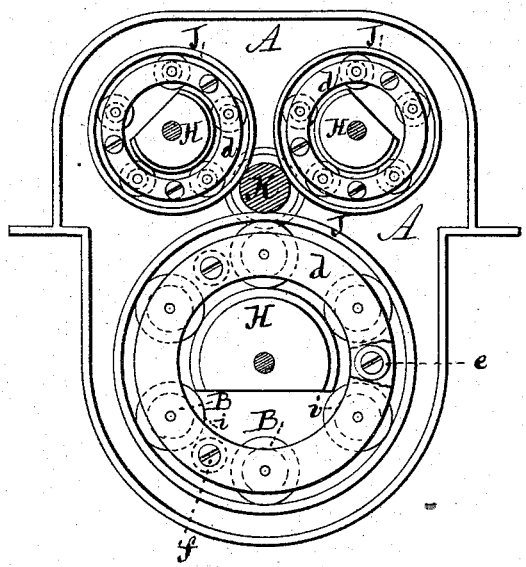
Figure 2:
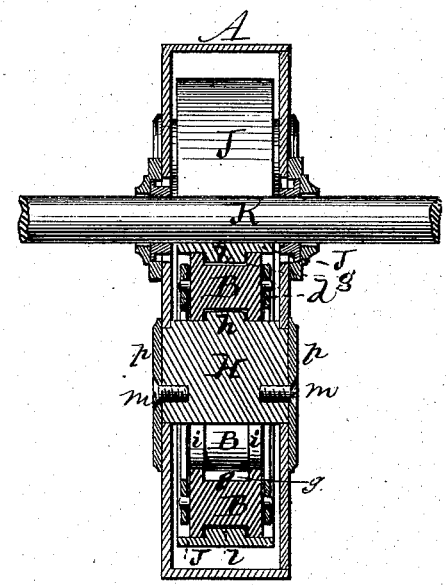

In the accompanying drawing, Figure 1 is a side view of my improved journal-jox with one of the plates removed. Fig. 2 is a central vertical section.

The journal-box A may be of any suitable form, and provided with any desired number of sets of rollers. In the drawing it is shown as being of a rounded oblong form, and provided with three sets of rollers—one large set below the center, and two smaller sets above. The rollers B are journaled in roller-frames, each frame consisting of two rings, d, with posts e between them, the rings being secured to the ends of the posts by screws f. The rollers B are provided with gudgeons at their ends, which have their bearings in the rings d. The face of each roller is formed with two bearing-surfaces, i i, one at each end, between which is a peripherical recess, g, engaging with a rib, h, on the fixed circular bearing H, which is a solid piece of metal rigidly attached to the casing A, and having a segment cut from one side, as shown in the drawing, to reduce the frictional surface, and to facilitate the placing of the rollers in position. Surrounding each set of rollers is a ring, J, the outer surface of which is a cylindrical bearing-surface for the shaft or axle K. On the inner surface of the ring J is a rib, or continuous projection, l, of the same form and size as the rib h on the fixed bearing H, and engaging with the recesses g in the rollers.

By this construction and combination of the parts the fixed bearing H prevents displacement of the rollers in an axial direction, and the rollers prevent displacement of the ring J.

As the shaft or axle K revolves, motion is communicated to the rings J, and by them transferred to the rollers B, causing them to revolve on their axes, and to travel around the fixed bearing H, thus dividing the friction between the ring and the rollers in each set.

The rings J have a continuous bearing on the rollers B, and also on the shaft or axle K, instead of having the axle in direct contact with the rollers, so that the bearing is uniform, regular, and continuous on all parts.

The face-plate may be secured to the casing A by screws m, passing through washers or plates p, and into the solid fixed bearings H.

What I claim as new, and desire to secure by Letters Patent, is—

1. The combination, with a shaft, K, of the fixed bearing H, arranged within the frame d, having the rollers B bearing against the fixed bearing H, and the ring J encircling the rollers B, and bearing against the shaft K, all substantially as herein shown and described.

2. The combination, with the fixed bearing H, having the projection h, of the rollers B, having recesses g adapted to said projections, and the ring J embracing the rollers, and having a continuous projection, l, fitting the recesses in the rollers B, all substantially as and for the purpose described.

3. The combination, with a shaft, K, of the fixed bearings H H H, arranged upon the upper and lower sides of the shaft, and provided with the frames d, with their rollers B, and the ring J embracing said rollers, and bearing against the shaft, substantially as and for the purpose described.

E. H. HALL.

Witnesses:
  HENRY T. BROWN,
  MICHAEL RYAN.